Feb. 18, 1930.  W. ELLWOOD  1,747,431
FILM MEASURING ATTACHMENT FOR MOTION PICTURE MACHINES
Filed May 25, 1921
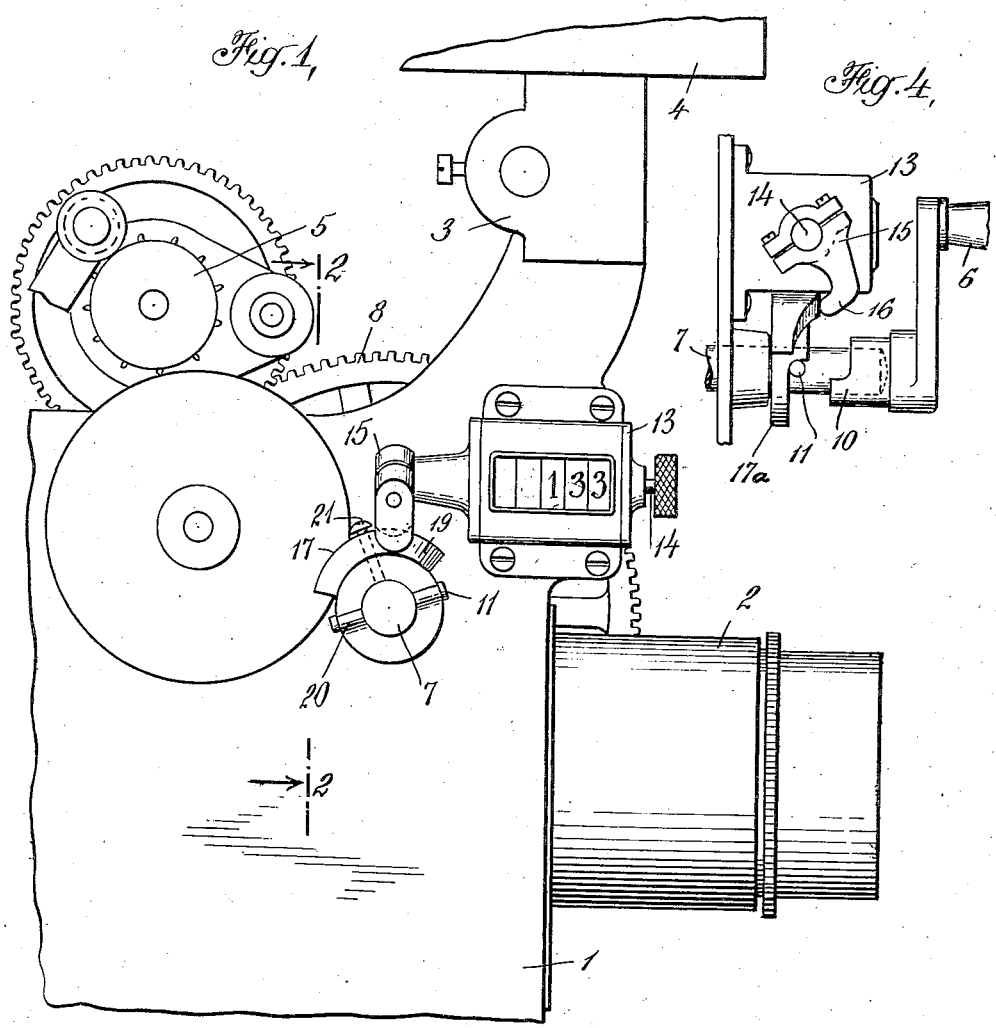
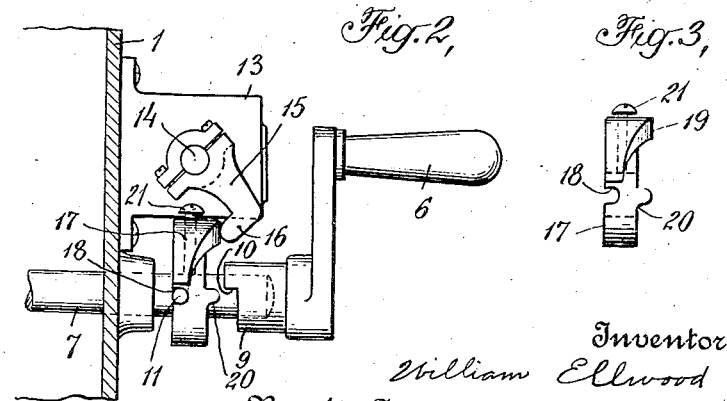
Inventor
William Ellwood
By his Attorneys
Pennie, Davis, Marvin & Edmonds Patented Feb. 18, 1930

1,747,431

UNITED STATES PATENT OFFICE

WILLIAM ELLWOOD, OF HEMPSTEAD, NEW YORK, ASSIGNOR TO NICHOLAS POWER COMPANY, INC., OF NEW YORK, N. Y., A CORPORATION OF DELAWARE

FILM-MEASURING ATTACHMENT FOR MOTION-PICTURE MACHINES

Application filed May 25, 1921. Serial No. 472,338.

This invention relates to film measuring attachments for motion picture machines, and has for its object to provide a simple film measuring apparatus applicable to motion picture machines of standard design without any change in the construction of the machine, and with the ordinary mechanic's tools.

It is desirable in the operation of a motion picture machine for the operator to know how much film remains on the reel still to be exhibited so that he may have the next reel ready for immediate projection, to thereby avoid interruptions and delays. The present-day motion picture drama usually embodies several thousand feet of film which must be projected from separate reels, usually of a thousand feet each. In order to show the film continuously without any interruption between one reel and the succeeding one, the practice is to employ two separate machines and to have the second machine threaded up and the light properly adjusted, etc. a sufficient time before the end of the first reel is reached for the second machine to be switched on simultaneously with the shutting off of the first machine. The actual change over from one machine to the other is effected by shutting off the operating motor of the first machine and closing the dowser of the lamp house and simultaneously closing the switch of the operating motor of the second machine and opening the dowser to allow the light from the previously adjusted and lighted arc to reach the film. It is not desirable to turn on the arc too long a time before the machine is to be used as the carbons will require readjustment before the exhibition starts. The practice is therefore to watch the progress of the film in the first machine and when the film is nearly completed to get the second machine in readiness for use.

The progress of the film must be observed by repeatedly opening the film magazine, which is itself troublesome and also dangerous in exposing the film to possible ignition. In fact, in many cities it is forbidden by fire ordinance to open a film magazine while the exhibition is in progress, so that the operators must either disregard the fire regulations or else gauge the progress of the film inaccurately by mere lapse of time.

By means of the present invention the number of feet of film remaining to be exhibited is indicated at all times so that the operator may know just the right moment to start the light of his second machine, etc. to secure the best and quickest change over from one machine to the other.

In the accompanying drawings I have illustrated my improved film measuring device applied to a motion picture machine of the kind known to the trade as Power's cameragraph, illustrated in Patent No. 1,184,126, granted May 23, 1916.

In the said drawings,

Figure 1 is a side elevation of a portion of the machine of that patent showing my improved film measuring device applied thereto;

Fig. 2 is a sectional view on the line 2—2 of Fig. 1;

Fig. 3 is a detail view of the actuating cam of the device; and

Fig. 4 is a detail view showing a modified form of cam.

Referring to the drawings, 1 indicates the frame of the machine having the usual projection lens 2 on its front wall and also the magazine supporting bracket 3 at the top of the machine upon which the film-containing magazine 4 is supported. The film is fed through the machine in the usual manner by rotating sprockets, one of which is indicated at 5, the sprockets and other moving parts of the machine being usually operated from an electric motor, not shown, through gearing or other power transmitting devices.

The machines are also provided with detachable hand cranks 6 (see Fig. 2) designed to be applied to one of the shafts of the machine so that the machine may be operated by hand in case of a breakdown to the motor, to complete the exhibition.

In machines of the type above referred to the hand crank is applied to a shaft 7 which carries one of the driving gears 8 of the machine and the teeth of the gear are proportioned with relation to the teeth of the film feeding sprocket so that each revolution of the shaft 7 corresponds to one foot of film fed by the sprocket.

In the construction shown in Fig. 4 of the drawing, the crank handle 6 is provided with a hollow hub 9 adapted to fit over the shaft 7, the end face of the hub being provided with shoulders 10 to engage a pin 11 driven through the shaft 7 adjacent its bearings, the pin and shoulders forming a detachable connection to permit the handle to be readily applied and removed when desired.

To adapt my improved film measuring device to a film of this type I employ the shaft 7 as the actuating shaft of the measure, for the reason that it make one complete rotation for each foot of film advanced.

An ordinary commercial counter, such as indicated at 13, of the type in which the indicator in advanced one number upon each oscillation of the countershaft, is preferably employed. This counter is attached to the side wall of the machine frame above and in front of the shaft 7 with the shaft 14 of the counter extending at right angles to the shaft 7 and with its end lying immediately over that shaft. Attached to the end of the shaft 14 is a rock arm 15 having a projection 16 on its free end adapted to engage a face cam 17 designed to be attached to the shaft 7.

The cam 17 of Fig. 2 is shown removed from the machine in Fig. 3 and consists essentially of a ring or disk having its rear face flat to lie against the bearing of the shaft 7 and with notches 18 cut in the rear face to engage the cross pin 11 to thereby lock the cam to the shaft.

The front face of the cam is provided with an inclined cam face 19 to engage the projection 16, the incline being of a depth sufficient to impart a working oscillation to the rock arm 15. The front face of the cam is also provided with projections 20, preferably opposite the notches 18 and corresponding in shape to the cross section of the pin 11, to thereby provide a complementary clutch member to be engaged by the shoulders 10 in the hub of the machine crank 6, so that the machine will be adapted for operation by hand in the usual manner. A set screw 21 may be provided to hold the cam against accidental displacement on the shaft 7. 10' is the lower part of the driven member.

Instead of the cam construction above described, I may employ a slightly modified cam such as shown in Fig. 4. The cam 17ª, shown in Fig. 4, is designed to fit between the cross pin 11 and the bearing of the shaft 7. To this end the hub of the cam 17ª is thicker throughout approximately half its circumference (preferably on that side of the cam containing the inclined face 19) thereby providing oppositely faced shoulders to engage the opposite ends of the pin 11, leaving the ends of the pin free to be engaged on one side by the corresponding shoulders 10 on the hub of the crank 6 as clearly shown in Fig. 4. In applying this cam to the shaft 7 the pin 11 is driven out and the cam placed on the shaft between the hole for the pin and the bearing of the shaft and when the pin is driven back in place it will hold the cam against longitudinal as well as rotary displacement.

In applying the device to the machine no modification of the machine is required except to drill in the metal of the machine frame the necessary holes for the attaching screws for the counter. The cam is applied without modification of the machine in any manner, and when in place does not interfere in any way with the usual operation of the hand crank.

In using the device the operator will note the number of feet of film in the reel to be projected (which is customarily stamped on the box containing the reel) and set the counter enough ahead for the counter to register 1000 when the reel is exhausted. He will then know when the counter indicates a certain number, say 900, that there remains for exhibition a sufficient number of feet to give him just time to properly arrange the second machine for use.

Instead of using counters of ordinary stock construction, I may use special counters having the figures on the dial reversed so as to subtract one from the displayed total upon each operation of the shaft of the counter. With such an arrangement the counter can be set in advance at the number corresponding to the number of feet in the reel to be exhibited, so as to indicate zero when the reel is exhausted.

With such an apparatus it might be desirable to have the counter arranged to show a signal, for instance, close the circuit through an electrical buzzer or small electric light when a certain number was displayed, thus directly calling the operator's attention to the necessity for making the second machine ready.

Other modifications may also be made if desired.

I claim:

In a projector which has a power-input shaft operable by a crank, a clutch member on said shaft, and a cam member thereon adapted to engage said clutch to actuate a register, said cam member being formed to provide a connection between said crank and said shaft.

In testimony whereof I affix my signature.
WILLIAM ELLWOOD.